United States Patent
Pita-Gil et al.

(10) Patent No.: US 9,903,780 B2
(45) Date of Patent: Feb. 27, 2018

(54) METHOD FOR DETECTING AN IMBALANCE OF A VEHICLE WHEEL WHILE THE VEHICLE IS ROLLING

(71) Applicant: RENAULT s.a.s., Boulogne Billancourt (FR)

(72) Inventors: Guillermo Pita-Gil, Paris (FR); Philippe Saint-Loup, Jouars Pontchartrain (FR); Joan Davins-Valldaura, Paris (FR)

(73) Assignee: RENAULT s.a.s., Boulogne Billancourt (FR)

( * ) Notice: Subject to any disclaimer, the term of this patent is extended or adjusted under 35 U.S.C. 154(b) by 140 days.

(21) Appl. No.: 15/024,170

(22) PCT Filed: Sep. 12, 2014

(86) PCT No.: PCT/FR2014/052268
§ 371 (c)(1),
(2) Date: Mar. 24, 2016

(87) PCT Pub. No.: WO2015/044552
PCT Pub. Date: Apr. 2, 2015

(65) Prior Publication Data
US 2016/0209291 A1 Jul. 21, 2016

(30) Foreign Application Priority Data
Sep. 24, 2013 (FR) .................................. 13 59179

(51) Int. Cl.
*G01M 1/28* (2006.01)
(52) U.S. Cl.
CPC ..................... *G01M 1/28* (2013.01)

(58) Field of Classification Search
CPC ........................................................ G01M 1/28
USPC ............................................................ 73/457
See application file for complete search history.

(56) References Cited

U.S. PATENT DOCUMENTS

2004/0172181 A1* 9/2004 Lu ...................... B60C 23/061
701/36

FOREIGN PATENT DOCUMENTS

FR     2 566 124         12/1985
WO    2007/030037 A1    3/2007

OTHER PUBLICATIONS

French Search Report dated Jun. 27, 2014 in FR 1359179 Filed Sep. 24, 2013.
International Search Report dated Nov. 10, 2014 in PCT/FR14/52268 Filed Sep. 12, 2014.

* cited by examiner

*Primary Examiner* — John Chapman, Jr.
(74) *Attorney, Agent, or Firm* — Oblon, McClelland, Maier & Neustadt, L.L.P.

(57) ABSTRACT

A method and device detect the imbalance of a vehicle wheel. The method includes measuring a rotation speed of the wheel while the vehicle is moving, and calculating a filtered value by applying at least one step of band-pass filtering to the measured rotation speed value of the wheel. A position of a pass-band of the band-pass filtering step is offset while moving as a function of the rotation speed of the wheel.

11 Claims, 3 Drawing Sheets

Figure 1:
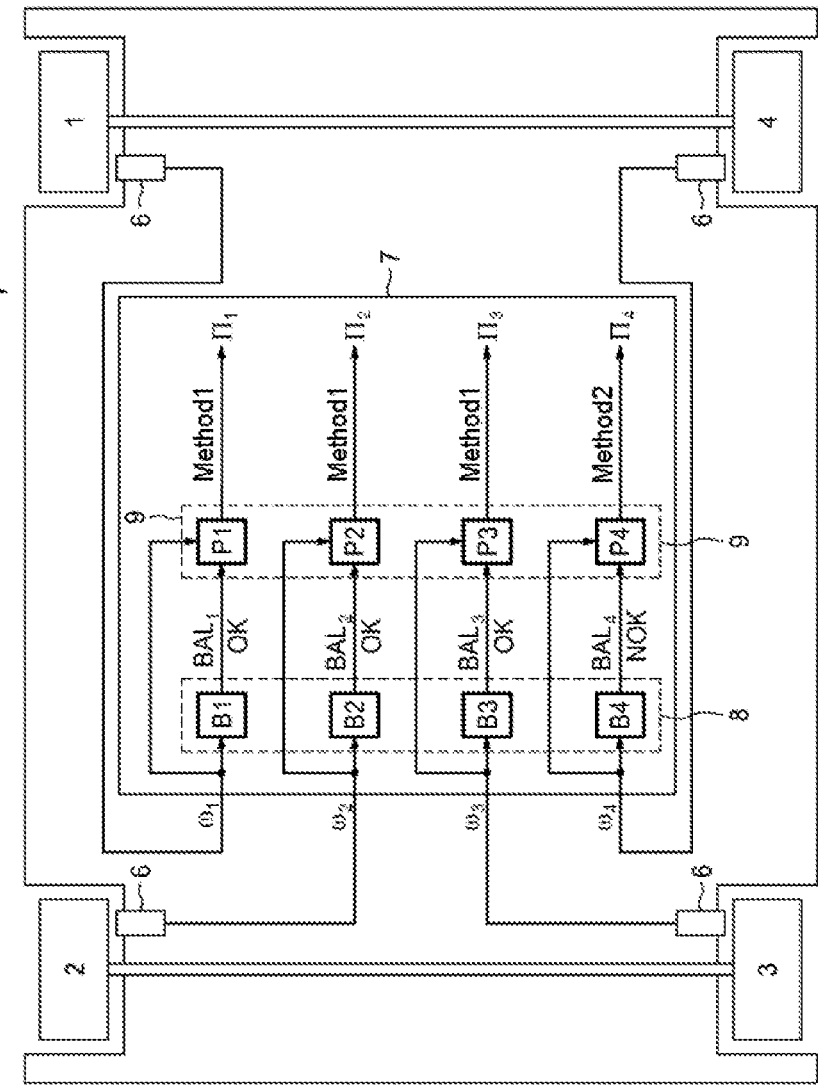

METHOD FOR DETECTING AN IMBALANCE OF A VEHICLE WHEEL WHILE THE VEHICLE IS ROLLING

The subject matter of the invention is a method for detecting a vehicle wheel imbalance while the vehicle is travelling on a road. By the imbalance of a wheel is meant an irregular angular distribution of the mass elements of the wheel. The inertia of an angular sector of the wheel may then be different from the inertia of another angular sector of the wheel of the same angular amplitude.

The processes of manufacturing the rims, tires and hubcaps introduce variations in the inertia of the wheels of motor vehicles. These variations are of an order of magnitude sufficient to generate vibrations in the transmission system.

These vibrations are notably liable to cause premature fatigue or even breakage of the mechanical components of the vehicle and generate discomfort for the driver and the passengers of the vehicle.

If the problem concerns a front wheel the vibrations will generally be perceived by the driver via the steering wheel and if they concern the rear wheels they will be detected by the passengers.

These vibrations are notably liable to cause malfunctions of the systems for monitoring the tire pressure. Some of these monitoring systems in fact make it possible to detect under-inflation of a wheel without using a pressure sensor, notably by analyzing a rotation speed signal for each wheel. The hypotheses for analysis of the signal are false if the wheel is not balanced.

Wheel balance defects resulting from the manufacturing process are nowadays dealt with on the production line by means of weights fixed to the contour of the rim to compensate the initial defect in the distribution of the masses. However, during the life of the vehicle, these weights may move or become detached from the wheel. This leads to an imbalance of the wheels concerned.

Systems for detecting a wheel imbalance are at present applicable only to wheels that have been removed and isolated from the vehicle or using a system that makes it necessary to place the vehicle on a test bench or, as in patent application WO2007030037 (VOLVO), for example, or in patent application JP52066242 (SHIMADZU CORP), make it necessary to equip the vehicle with vibration sensors associated with the wheels.

Patent application JP55089729 (KOHGIKEN) proposes a detection system external to the vehicle. This is a system that is coupled to the wheels of the vehicles (without removing them) to diagnose an imbalance.

An object of the invention is to propose a system and a method for detecting an imbalance of a wheel of a vehicle that is able to monitor any occurrence of an imbalance while the vehicle is moving quasi-continuously and at the level of each wheel of the vehicle. It must be possible to apply this detection method without using sensors of the inflation pressure of the tire on the wheel or a sensor of vibration of the wheel.

To this end, the invention proposes a method of detecting the imbalance of a vehicle wheel, in which a rotation speed of the wheel is measured while the vehicle is moving and a filtered value is calculated by applying at least one step of band-pass type filtering to the measured rotation speed value of the wheel. The position of the pass-band of the band-pass filtering step is offset while moving as a function of the rotation speed of the wheel.

In a particularly advantageous manner, the rotation speed of the wheel is measured while the vehicle is moving. Here the balance of the wheel means a regular angular distribution of the masses contributing to the moment of inertia of the wheel relative to its rotation axis. The speed of the wheel may be expressed as an angular speed or may be expressed as a corresponding linear speed of the vehicle in km/hour by applying a rule of three involving the theoretical radius of the wheel.

A variance value is then preferably calculated representative of a statistical variance of the filtered value and this variance value is compared to a variance threshold. The variance threshold is preferably constant. In accordance with one variant embodiment, the variance threshold is a function of a speed of the wheel, for example of the measured value of the speed of the wheel, to which a low-pass filter has been applied.

In accordance with one preferred embodiment, the variance is calculated by applying a step of low-pass type filtering to the absolute value of the difference between the filtered value and a mean filtered value, the mean filtered value being itself the result of low-pass filtering of the filtered value.

The result of the comparison of the variance with the variance threshold is advantageously taken into account only during phases of movement in which the speed of the vehicle may be considered as stabilized. The speed of the vehicle may notably be considered to be stabilized if the absolute value of a filtered derivative of a speed value of the wheel remains below an acceleration threshold for a duration greater than or equal to a time threshold. The methods of calculating filtered derivatives are known.

A first step of low-pass type filtering may moreover be applied to a value delivered by a wheel speed sensor to obtain a wheel rotation speed to which the band-pass type filtering step is then applied.

Advantageously, a final step of low-pass type filtering is moreover applied to the variance value to obtain a filtered variance value that is compared to the variance threshold. The variance threshold may typically be between 0.03 and 0.6 kmh$^{-1}$, for example equal to 0.4 kmh$^{-1}$ for a family type vehicle.

The band-pass filtering step may be effected by means of a discrete band-pass filter characterized by five variable coefficients, the five coefficients being calculated as a function of three constant coefficients and a rotation speed of the wheel. In accordance with one advantageous embodiment, one of the constant coefficients is similar to a sampling period of the computer implementing the band-pass filtering.

In accordance with another aspect, the invention proposes an application of a detection method as described above to monitoring of the level of inflation of the wheels of a motor vehicle. This monitoring may be effected by using rotation speed values for each wheel of the vehicle to detect any anomaly in respect of the inflation of the wheel. For example, there is applied to each rolling wheel of the vehicle a method whereby, if the variance value of the speed of one of the wheels becomes greater than the variance threshold, the mode of evaluation of the level of inflation of the wheel considered is modified. The mode of evaluation is considered to be modified if, for example, an alert mode, which may be directed at the driver or to other monitoring systems, is no longer taken into account or is taken into account differently. The mode of evaluation is also considered to be modified if, for example, the level of inflation of a tire of the wheel is evaluated by means of a first analytical formula while the variance of the speed of the wheel remains less than or equal to the variance threshold and is evaluated by means of a different analytical formula when the speed of the wheel becomes greater than the variance threshold.

It will be noted that the filtering and variance calculation operations are all calculated while the vehicle is moving.

The invention further proposes a device for detecting a motor vehicle wheel imbalance, the device notably including a sensor of the rotation speed of at least one wheel of the vehicle and a unit for calculating an imbalance criterion for the wheel. The calculation unit is configured to effect a series of filtering operations on the speed sensor signal to arrive at a criterion value, including at least one step of band-pass type filtering, and is configured, during at least some steps of movement of the vehicle, to compare the criterion value to a threshold. These steps of movement preferably correspond to steps in which the speed of the vehicle may be considered as stabilized.

The invention also concerns a vehicle equipped with the detection device described above.

Figure 2:
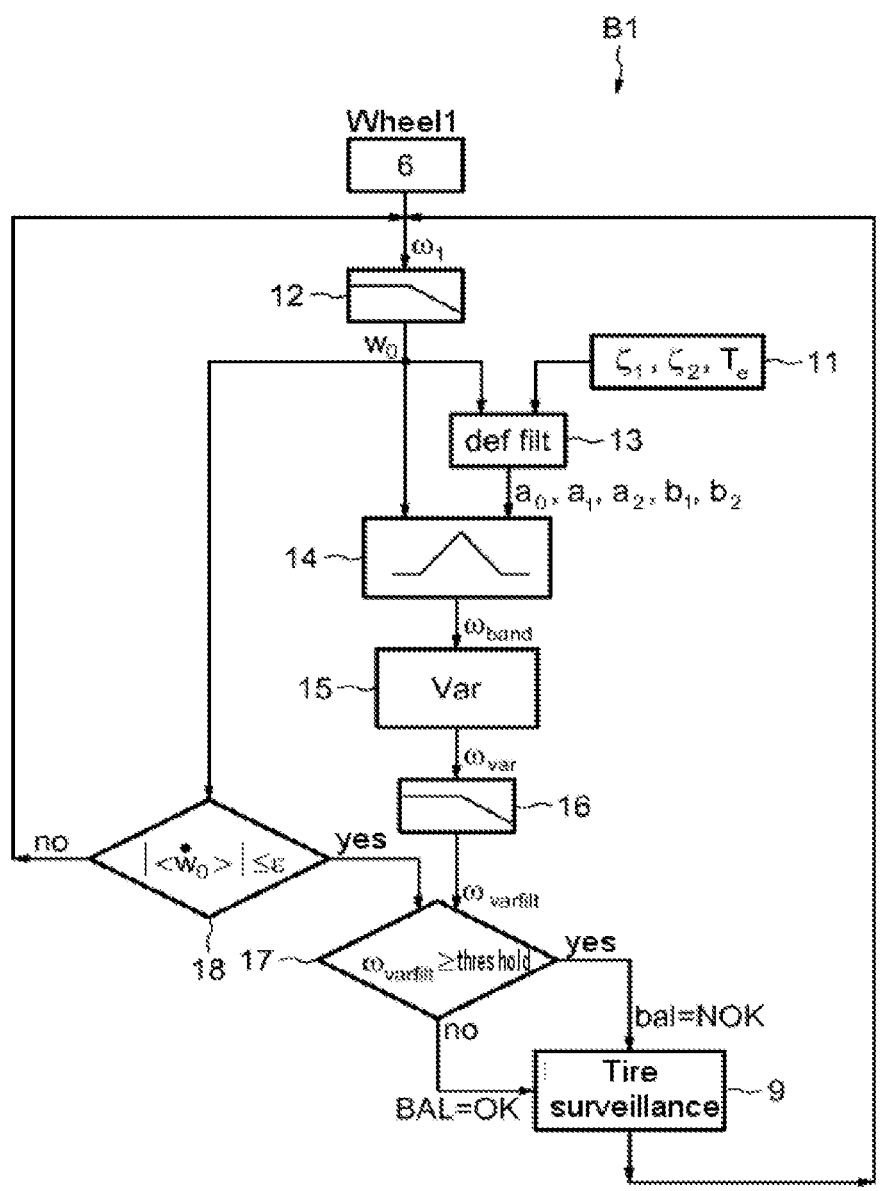
Figure 3:
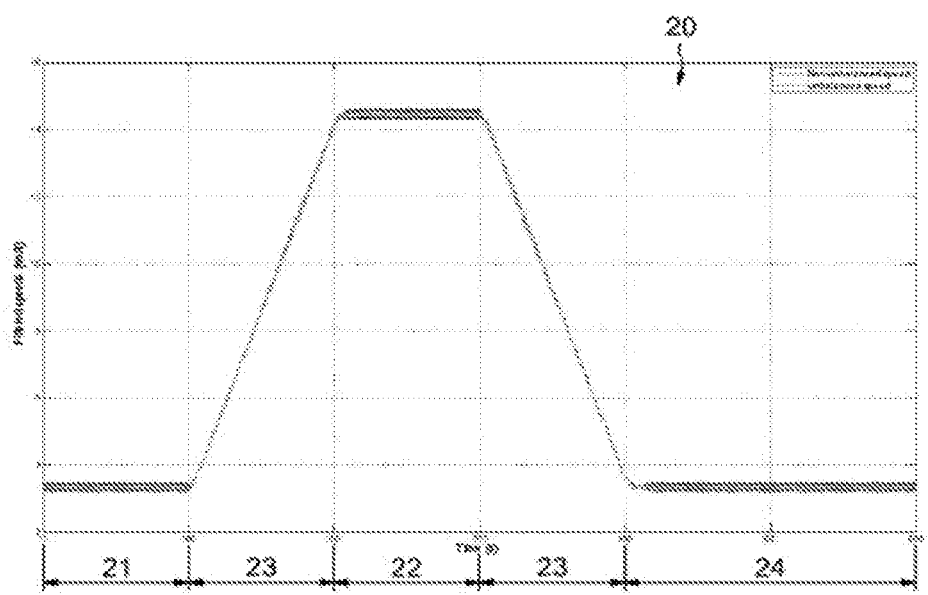
Figure 4:
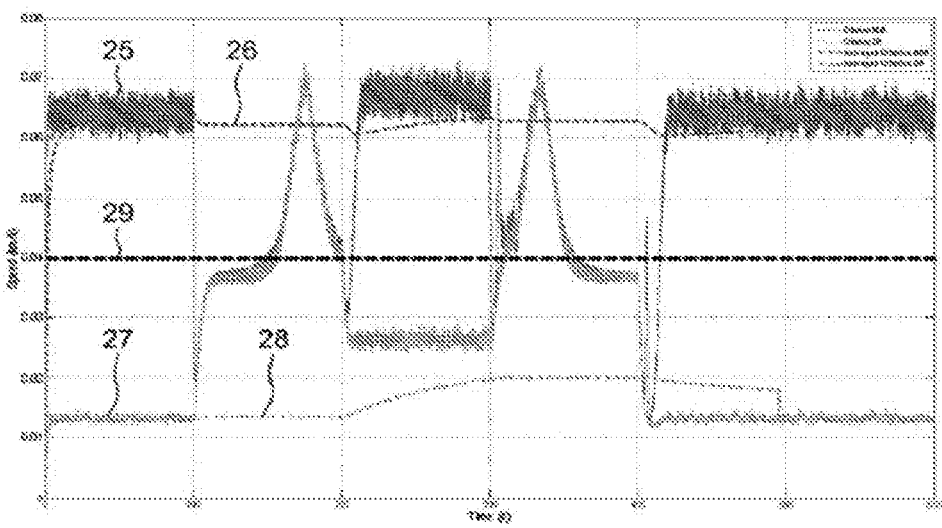

Other objects, features and advantages of the invention will appear on reading the following description, given by way of nonlimiting example only and with reference to the appended drawings, in which:

FIG. 1 shows a vehicle equipped with a detection device in accordance with the invention, FIG. 2 is a simplified diagram of the operation of a detection device in accordance with the invention, FIG. 3 shows wheel speed curves obtained in a calculation step of a detection method in accordance with the invention, FIG. 4 shows wheel speed variance curves obtained in another calculation step of a detection method in accordance with the invention.

As shown in FIG. 1, a vehicle 5 moves on four wheels 1, 2, 3 and 4. Each of the wheels is equipped with a speed sensor 6 dedicated to the wheel. The speed sensors 6 dedicated to the respective wheels 1, 2, 3 and 4 deliver a respective angular speed value or a respective value proportional to an angular speed $\omega_1$, ($\omega_2$, $\omega_3$, $\omega_4$ to an electronic control unit 7 of the vehicle. To be more precise, the speed sensors actually associated with the wheels 1, 2, 3 and 4 deliver the speed they register to a first, second, third and fourth module, respectively, for calculating a balancing criterion $B_1$, $B_2$, $B_3$, $B_4$, respectively, associated with the wheel.

Each module for calculating a balancing criterion sends a respective Boolean value $BAL_1$, $BAL_2$, $BAL_3$, $BAL_4$ to a first, second, third and fourth module, respectively, for calculating a respective pressure criterion $P_1$, $P_2$, $P_3$, $P_4$ for the tire associated with the wheel.

Each module for calculating the pressure criterion also receives the respective rotation speed value $\omega_1$, $\omega_2$, $\omega_3$, $\omega_4$ coming from the speed sensor 6 of the wheel concerned.

The tire pressure calculation modules can use various methods for calculating the pressure in the tire, notably a method designated Method1 and a method designated Method2 which is less sensitive than Method1 to the effects of the imbalances of the wheel, whilst being a priori less accurate than Method1 for a correctly balanced wheel.

As long as the indicators $BAL_1$, $BAL_2$, $BAL_3$, $BAL_4$ indicate that the wheel concerned is correctly balanced, the modules for calculating the pressure criterion $P_1$, $P_2$, $P_3$, $P_4$ use the first method Method1 to calculate a respective pressure $\pi_1$, $\pi_2$, $\pi_3$, $\pi_4$ of the pressure in the tire. If the Boolean values corresponding to the balancing criteria $BAL_1$, $BAL_2$, $BAL_3$, $BAL_4$ indicate that the balancing of the wheel is not sufficient, as illustrated here for wheel 4, for example, the balancing criteria calculation module, for example $P_4$ here, sends a negative Boolean signal to the corresponding tire pressure calculation module, which then selects a method, here Method2, that is less sensitive to the effects of the imbalance of the wheel.

In the example shown in FIG. 1, the pressures of the tires of wheels 1, 2 and 3 are therefore calculated in accordance with Method1 because the wheels are correctly balanced and the pressure $\pi_4$ of the fourth wheel is calculated by another method, Method2, that is less accurate overall but is also less sensitive to the effects of the wheel imbalance.

FIG. 2 illustrates a portion of the mode of operation of the unit 8 for evaluating the imbalance of the wheels combining the modules $B_1$, $B_2$, $B_3$, $B_4$ from FIG. 1.

In FIG. 1, the modules for calculating the tire pressure criteria of the wheel can be grouped together within the same unit 9 for calculating the pressure of the wheels of the vehicle. FIG. 2 illustrates a portion of the mode of operation of one of the calculation modules $B_1$, $B_2$, $B_3$, $B_4$ of the electronic control unit 7, for example the module $B_1$.

As shown in FIG. 2, the rotation speed $\omega_1$ of the wheel 1, measured by one of the speed sensors 6, is transmitted to a first low-pass filter 12 that delivers a filtered wheel rotation speed value $w_0$. This filtered speed value is sent on the one hand to a module 13 for defining parameters of a band-pass filter 14 and on the other hand to the corresponding band-pass filter 14. The filtered speed $w_0$ is also sent to a comparator unit that calculates a filtered differentiated value $\dot{w}_0$ of the speed and compares the absolute value $|\dot{w}_0|$ of the acceleration obtained in this way to a threshold $\epsilon$ to decide if the speed of the vehicle can be considered as stabilized or not.

The definition module 13 of the filter 14 uses three values $\xi_1$, $\xi_2$, $T_e$ stored in memory units 11. These values $\xi_1$, $\xi_2$, $T_e$ are constant values and are used by the module 13 conjointly with the speed $w_0$ of the wheel to define five filter parameters $a_0$, $a_1$, $a_2$, $b_1$, $b_2$ that are sent to the band-pass filter 14. The band-pass filter 14 applies band-pass type filtering to the speed $w_0$ and delivers a value $\omega_{band}$ to a module 15 for calculating the variance of the speed.

The speed variance module 15 then delivers a value $\omega_{var}$ to a low-pass filter 16 that in turn delivers a value $\omega_{varfilt}$ corresponding to a filtered variance of the speed of the wheel 1.

A comparator 17 compares this value to a variance threshold "threshold". If the filtered variance value $\omega_{varfilt}$ is greater than the threshold, the comparator 17 delivers a Boolean value "BAL", for example a negative value, to the unit 9 for calculating the inflation pressure of the tires.

If the filtered variance $\omega_{varfilt}$ is less than the threshold, it is an opposite Boolean value "BAL", for example a positive value here, that the comparator delivers to the tire pressure monitoring module 9. Variant embodiments may be envisaged in which the meaning of the Boolean variant BAL would be inverted and the overall reasoning would remain the same.

However, the Boolean value BAL is delivered only if the test 18 concerning the stabilization of the speed $w_0$ indicates that the speed of the vehicle is actually stabilized. If the speed of the vehicle is not stabilized, the Boolean value BAL is not sent and monitoring of the speed of the wheel continues, for example by returning to the method on the upstream side of the first low-pass filter 12.

In FIG. 3 two curves of a wheel speed of a vehicle as a function of time are grouped together. There are seen a darker gray curve corresponding to an unbalanced wheel speed and a lighter gray speed corresponding to a balanced wheel speed. In the example shown, the vehicle first travels at a speed close to 30 km/h before accelerating and stabilizing at a speed close to 140 km/h, and then falls again to 30 km/h. The time intervals 21 and 24 correspond to stabilized travel at 30 km/h, the time interval 22 corresponds to travel at 140 km/h and two time intervals 23 correspond to a non-stabilized travel regime for changing the speed from 30 to 140 km/h and vice versa.

Note that during the plateau phases 21, 22 and 24 the speed of the unbalanced wheel features oscillations of greater amplitude than the speed of the correctly balanced wheel. The curves shown in FIG. 3 correspond to curves resulting from a first step of low-pass filtering, for example of the same type as the filtering step 12 shown in FIG. 2.

FIG. 4 shows the curves from FIG. 3 after they are processed by the band-pass filter 14 from FIG. 2 and then after they are filtered by a final low-pass filter 16. The dark gray continuous curve 25 therefore represents the speed value of an unbalanced wheel after the speed sent by the sensors has passed through the low-pass filter 12 and then through the band-pass filter 14 and then through the variance calculation module 15.

The light gray continuous curve 27 represents the rotation speed variance of a correctly balanced wheel after the same process of filtering the speed value delivered by the sensor associated with that wheel. The dark dashed line curve 26 is obtained by applying a low-pass filter to the curve 25 during the phases 21, 22 and 24 during which the speed 1 of the vehicle is stabilized. During the transient phases 23, the value of the curve 26 remains constant, equal to the latest preceding value calculated. The light dashed line curve is the result of analogous processing of the variance curve 27 of the balanced wheel. The curves 26 and 28 can be compared to a threshold, here chosen as equal to 0.04 km/h. This comparison corresponds to the test effected by the comparator 17 from FIG. 2 and can be applied only during the phases 21, 22 and 24 in which the speed of the vehicle is stabilized. During the transient phases 23, either the test 17 may be omitted, as in FIG. 4, or an arbitrary value may be assigned to the filtered variance function. As can be seen in FIG. 4, the curves resulting from the processing in accordance with the invention of the speed delivered by a speed sensor for each wheel may each be compared to a threshold and deliver relatively constant information making it possible to tell if the wheel is correctly balanced or not.

The band-pass filter of the invention is chosen to have a very narrow pass-band. It is a discrete filter because its object is to be implemented in a vehicle computer. This pass-band is centered on the speed of the wheel, estimated on the basis of the output of the sensor associated with the wheel, to the exclusion of the sensors associated with the other wheels of the vehicle. The estimated speed of the wheel on which the pass-band is centered may be a value that has already undergone digital filtering to eliminate the noise from the signal from the sensor.

The band-pass filter is an adaptive filter, i.e. the "passing" frequencies are offset as a function of the instantaneous rotation speed of the wheel, to remain centered on this rotation speed.

The preferred band-pass filter in the context of the invention is a "band-pass" filter of simple structure but one incorporating parameters that may be linked to physical values measurable on the vehicle. The proposed structure is described by the following transfer function:

$$PB(s) = \frac{s^2 + 2\xi_1 w_0 s + w_0^2}{s^2 + 2\xi_2 w_0 s + w_0^2}$$

where $w_0$ is the "passing" frequency and $\xi_1$ and $\xi_2$ are the damping coefficients of the two complex conjugate poles (respectively zero).

The parameters $\xi_1$ and $\xi_2$ are chosen by trial and error, for example, so that the width of the pass-band encompasses the components of the signal linked to the imbalance, at the same time as eliminating the peaks linked to phenomena other than the imbalance.

The invention proposes to effect a change of variables making it possible to replace this filter with an equivalent discrete filter.

The roots of the numerator/denominator are:

$$s = \frac{-2\xi_i w_0 \pm \sqrt{4\xi_i^2 w_0^2 - 4w_0^2}}{2} = -\xi_i w_0 \pm \sqrt{\xi_i^2 w_0^2 - w_0^2} = -\xi_i w_0 \pm w_0 \sqrt{\xi_i^2 - 1}$$

Moreover, it is known that by construction the roots are conjugate and complex and therefore: $\xi_1^2 - 1 < 0$. This enables the roots of the numerator/denominator to be written in the form:

$$s = -\xi_1 w_0 \pm w_0 \sqrt{1 - \xi_1^2} i$$

where i is the imaginary number corresponding to the root of −1.

In the invention, a discrete band-pass filter is chosen having a transfer function of the type:

$$PB(z^{-1}) = \frac{a_0 + a_1 z^{-1} + a_2 z^{-2}}{1 + b_1 z^{-1} + b_2 z^{-2}} = \frac{a_0 z^2 + a_1 z^1 + a_2}{z^2 + b_1 z^1 + b_2}$$

where $z^{-1}$ is the unitary delay operator.

The band-pass filter is therefore characterized by five coefficients a0, a1, a2, b1, b2.

The invention proposes to use a particular discretization method, "matched discretization". This discretization method makes it possible to ensure that the passing frequencies of the discrete filter remain correctly centered on the same passing frequencies as those of the chosen continuous filter.

Applying this discretization method yields:

$$a_0 z^2 + a_1 z^1 + a_2 = 0 \leftrightarrow a_0 z^2 + \frac{a_1}{a_0} z + \frac{a_2}{a_0} = 0$$

where:

$$z = \frac{-\frac{a_1}{a_0} \pm \sqrt{\frac{a_1^2}{a_0^2} - \frac{4a_2}{a_0}}}{2} = -\frac{a_1}{2a_0} \pm \sqrt{\left(\frac{a_1}{2a_0}\right)^2 - \frac{a_2}{a_0}}$$

It is also known that the roots are conjugate and complex and therefore:

$$\left(\frac{a_1}{2a_0}\right)^2 - \frac{a_2}{a_0} < 0$$

That is to say:

$$z = -\frac{a_1}{2a_0} \pm \sqrt{\frac{a_2}{a_0} - \left(\frac{a_1}{2a_0}\right)^2} \, i$$

And for the denominator:

$$z = -\frac{b_1}{2} \pm \sqrt{b_2 - \left(\frac{b_1}{2}\right)^2} \, i$$

The poles and the zeroes of the filters are then matched:

$$z = e^{sT_e}$$

where $T_e$ is the sampling period.

$$-\frac{a_1}{2a_0} \pm \sqrt{\frac{a_2}{a_0} - \left(\frac{a_1}{2a_0}\right)^2} \, i = e^{T_e\left[-\xi_1 w_0 \pm w_0 \sqrt{1-\xi_1^2}\right]}$$

$$-\frac{a_1}{2a_0} \pm \sqrt{\frac{a_2}{a_0} - \left(\frac{a_1}{2a_0}\right)^2} \, i = e^{-\xi_1 w_0 T_e} e^{\pm w_0 T_e \sqrt{1-\xi_1^2}} \, i$$

Four intermediate calculation variables $C_1, C_2, C_3, C_4$ are defined.

$$\begin{cases} -\frac{a_1}{2a_0} = e^{-\xi_1 w_0 T_e} \cos\left(w_0 T_e \sqrt{1-\xi_1^2}\right) = C_1 \\ \sqrt{\frac{a_2}{a_0} - \left(\frac{a_1}{2a_0}\right)^2} = e^{-\xi_1 w_0 T_e} \sin\left(w_0 T_e \sqrt{1-\xi_1^2}\right) = C_2 \end{cases}$$

$$\begin{cases} -\frac{a_1}{2} = e^{-\xi_2 w_0 T_e} \cos\left(w_0 T_e \sqrt{1-\xi_1^2}\right) = C_3 \\ \sqrt{\frac{a_2}{1} - \left(\frac{a_1}{2}\right)^2} = e^{-\xi_2 w_0 T_e} \sin\left(w_0 T_e \sqrt{1-\xi_2^2}\right) = C_4 \end{cases}$$

A supplementary condition to be respected for the discretization is that the static gain must be unitary, that is to say:

$$a_0 + a_1 + a_2 = 1 + b_1 + b_2$$

This yields a system of five equations with five unknowns the solution of which is:

$$\begin{cases} b_1 = -2C_3 \\ b_2 = C_4^2 + C_3^2 \\ a_0 = \frac{1 + C_4^2 + C_3^2 - 2C_3}{1 + C_2^2 - 2C_1 + C_1^2} \\ a_1 = \frac{-2C_1(1 + C_4^2 + C_3^2 - 2C_3)}{1 + C_2^2 - 2C_1 + C_1^2} \\ a_2 = 1 + b_1 + b_2 - a_0 - a_1 \end{cases}$$

The filter definition module 13 is configured to calculate the five coefficients $a_0, a_1, a_2, b_1, b_2$ from the filtered speed $w_0$ and from three constant parameters $\xi_1, \xi_2, T_e$ the last of which is correlated with a sampling period of the computer applying the band-pass filter 14.

If the signals from two different wheels of the vehicle are observed at the output of the band-pass filter (these signals are shown in FIG. 3) there can very clearly be seen a difference between the signals coming from a balanced wheel (light gray) and from an unbalanced wheel (dark gray). Whereas if a signal equal to the difference between the speed signals of two wheels is looked at it is not possible to tell the status of each wheel.

FIG. 3 shows a difference in terms of the variance of the signal between the balanced wheel and the unbalanced wheel. In other words, the two signals have the same mean values but the signal coming from an unbalanced wheel varies more around this common mean value.

This is why the invention proposes to apply a transformation of the signal at the level of the variance calculator 15 the result of which is indicative of the variance of the signal. Multiple calculation methods may be envisaged. To make the calculation process simple and robust, the invention proposes the following transformation:

$$\omega_{var} = \langle |(\omega_{band} - \langle \omega_{band} \rangle)| \rangle$$

where $\langle \, \rangle$ is an averaging operator, for example a low-pass filter.

In other words, a filtered mean speed is calculated by applying low-pass filtering to the filtered speed $\omega_{band}$ after which the absolute value of the difference between the output $\omega_{band}$ of the band-pass filter and the filtered mean speed is calculated. Numerous other formulas for quantifying a variance may be envisaged.

The variable $\omega_{var}$ may itself be subjected to filtering, for example low-pass type filtering 16, to obtain a filtered variance value $\omega_{varfilt}$ with less noise.

The value $\omega_{var}$ can then be compared to a variance threshold "threshold". In the variant embodiments, the value $\omega_{var}$ may be further filtered, for example by a low-pass filter 16, before it is compared to the threshold. As shown in FIG. 2, the result of the comparison with the threshold is taken into account only if the rotation regime of the wheel is in a stabilized phase, for example if the absolute value of an angular acceleration of the wheel, calculated from the filtered speed $w_0$, for example, has remained less than an acceleration threshold $\epsilon$ for a minimum time $\delta t_0$.

The system can learn the variance threshold "threshold" when the vehicle moves the first few times or it may be a value stored in the computer of the vehicle during the process of manufacture of the car. In accordance with a variant embodiment, this value may be modified when the wheels are rebalanced.

The invention is not limited to the example embodiments described and lends itself to numerous variants. Supplementary noise filtering steps may be introduced into the procedure or the low-pass filter 12 and/or 16 omitted. The wheel speed subjected to the filtering may be an angular speed or a value proportional to that angular speed with a constant factor of proportionality, for example the corresponding speed in km/h of the vehicle based on the theoretical diameter of the wheel.

Thanks to the detection system in accordance with the invention, it is possible to detect at any time when the vehicle is moving that one of the wheels of the vehicle is no longer balanced and to adapt the wheel monitoring systems, for example a system monitoring the inflation of the tires, to limit the inaccuracies linked to this imbalance.

The invention claimed is:

1. A method of detecting the imbalance of a vehicle wheel, comprising:
   measuring a rotation speed of the wheel while the vehicle is moving;

calculating a filtered value by applying at least one step of band-pass filtering to the measured rotation speed value of the wheel, wherein a position of a pass-band of the band-pass filtering step is offset while moving as a function of the rotation speed of the wheel.

2. The detection method as claimed in claim 1, further comprising:

calculating a variance value representative of a statistical variance of the filtered value; and comparing the variance value to a variance threshold.

3. The detection method as claimed in claim 2, wherein the variance value is calculated by applying a step of low-pass filtering to the absolute value of a difference between the filtered value and a mean filtered value, the mean filtered value being a result of low-pass filtering of the filtered value.

4. The detection method as claimed in claim 2, wherein a result of the comparing the variance value to the variance threshold is taken into account only during phases of movement in which a speed of the vehicle is considered as stabilized.

5. The detection method as claimed in claim 2, further comprising:

applying a first step of low-pass filtering to a value delivered by a wheel speed sensor to obtain a wheel rotation speed to which the band-pass filtering step is then applied.

6. The detection method as claimed in claim 2, further comprising:

applying a final step of low-pass filtering to the variance value to obtain a filtered variance value that is compared to the variance threshold.

7. The detection method as claimed in claim 2, wherein the detection method is applied to monitoring of a level of inflation of the wheels of the vehicle.

8. The detection method as claimed in claim 1, wherein the band-pass filtering step is effected by means of a discrete band-pass filter characterized by five variable coefficients, the five coefficients being calculated as a function of three constant coefficients and a rotation speed of the wheel.

9. A device for detecting the imbalance of a motor vehicle wheel, comprising:

a sensor of a rotation speed of a wheel; and a calculation unit to calculate an imbalance criterion for the wheel, wherein the calculation unit is configured to effect at least one step of band-pass filtering of a speed sensor signal of the sensor, a position of a pass-band being offset while moving as a function of the rotation speed of the wheel.

10. The device as claimed in claim 9, wherein the calculation unit is configured, during at least some steps of movement of the vehicle, to compare to a threshold a criterion value produced by filtering including the band-pass filtering step.

11. A vehicle, comprising:

a detection device as claimed in claim 9.

* * * * *